United States Patent
Austin et al.

(10) Patent No.: US 11,444,695 B2
(45) Date of Patent: Sep. 13, 2022

(54) OPTICAL SHUFFLE COMPUTATION NETWORK

(71) Applicant: Fathom Computing, Palo Alto, CA (US)

(72) Inventors: Dane R. Austin, Pacifica, CA (US); William Andregg, Palo Alto, CA (US); Erik C. Nelson, Pleasanton, CA (US); Robert T. Weverka, Boulder, CO (US)

(73) Assignee: Fathom Radiant, PBC, Boulder, CO (US)

( * ) Notice: Subject to any disclaimer, the term of this patent is extended or adjusted under 35 U.S.C. 154(b) by 19 days.

(21) Appl. No.: 17/020,661

(22) Filed: Sep. 14, 2020

(65) Prior Publication Data

US 2021/0083773 A1    Mar. 18, 2021

Related U.S. Application Data (60) Provisional application No. 62/900,225, filed on Sep. 13, 2019.

(51) Int. Cl.
*H04B 10/00* (2013.01)
*H04B 10/27* (2013.01)
*H04B 10/516* (2013.01)

(52) U.S. Cl.
CPC ........... *H04B 10/27* (2013.01); *H04B 10/516* (2013.01)

(58) Field of Classification Search
CPC .............................. H04B 10/27; H04B 10/516
USPC ........................................................ 398/152
See application file for complete search history.

(56) References Cited

U.S. PATENT DOCUMENTS

| | | |
|---|---|---|
| 2,794,977 A | 6/1957 | Stoddart |
| 3,724,924 A | 4/1973 | Lenfant |
| 5,165,104 A | 11/1992 | Weverka |
| 5,321,639 A | 6/1994 | Krishnamoorthy |
| 5,440,654 A | 8/1995 | Lambert |

(Continued)

OTHER PUBLICATIONS

Philippe J. Marchand et al. ("Optically Augmented 3-D Computer: Technology and Architecture", pp. 133-139, 1994 IEEE ) (Year : 1994).*

(Continued)

*Primary Examiner* — Mohammad R Sedighian
(74) *Attorney, Agent, or Firm* — Macheledt Bales LLP; Jennifer L. Bales (57) ABSTRACT

Optical communication system communicates between an array of originating tiles and an array of terminating tiles. Each array is associated with a lenslet array, such as a two-layer array which has two layers of lenslets. Each originating tile has an array of transmitters and each terminating tile has an array of receivers. Each tile is associated with a common lenslet or lenslet pair. A beamlet from a representative transmitter passes through the lenslet pair adjacent to its tile to become a collimated beam whose angle is related to the location of the transmitter. The collimated beam passes through the receiver lenslet pair adjacent to the tile containing the receiver associated with the representative transmitter, and is focused onto that receiver by that lenslet pair. The system may operate in the reverse direction, wherein the transmitters are transmitter-receivers, the receivers are receiver-transmitters, and a beam from a receiver-transmitter is directed to its corresponding transmitter-receiver.

14 Claims, 12 Drawing Sheets

(56) References Cited

U.S. PATENT DOCUMENTS

| | | | |
|---|---|---|---|
| 5,524,153 | A | 6/1996 | Laor |
| 6,002,818 | A | 12/1999 | Fatehi |
| 6,424,756 | B1 | 7/2002 | Kalman |
| 6,898,013 | B2 | 5/2005 | Hall |
| 7,127,136 | B2 | 10/2006 | Hall |
| 7,864,757 | B2 | 1/2011 | Hall |
| 2006/0008199 | A1* | 1/2006 | Glebov .................. G02B 6/43 385/15 |
| 2016/0091782 | A1* | 3/2016 | Hashizume .......... G03B 21/204 353/84 |
| 2019/0067894 | A1* | 2/2019 | Stephen ................ H01S 3/0071 |

OTHER PUBLICATIONS

"Design Rules for Highly Parallel Free-Space Optical Interconnects", Kirk et al., IEEE Journal of Selected Topics in Quantum Electronics, vol. 9, No. 2, Mar./Apr. 2003.

"Experimental free-space optical network for massively parallel computers", Araki et al., Applied Optics, Mar. 10, 1996 @ vol. 35, No. 8.

"Analysis of a microchannel interconnect based on the clustering of smart-pixel-device windows", Rolston et al., Applied Optics, vol. 35, No. 8 @ Mar. 10, 1996.

"Optical Interconnects at the Chip and Board Level: Challenges and Solutions", Plant et al., Proceedings of the IEEE, vol. 88, No. 6, Jun. 2000.

"Optical interconnects to electronic chips", Miller, Applied Optics, Sep. 2010 / vol. 49, No. 25.

"Toward an optimal foundation architecture for optoelectronic computing. Part I. Regularly interconnected device planes", Ozaktas, Applied Optics, vol. 36, No. 23, Aug. 10, 1997.

"Toward an optimal foundation architecture for optoelectronic computing. Part I. Physical construction and application platforms", Ozaktas, Applied Optics, vol. 36, No. 23, Aug. 10, 1997.

"Optical Interconnections for VLSI Systems", Goodman et al., Proceeding of the IEEE, vol. 72, No. 7, Jul. 1984.

"VCSEL-array-based angle-multiplexed optoelectronic crossbar interconnects", Li et al., Applied Optics @ vol. 35, No. 8 @ Mar. 10, 1996.

"Self-similar grid patterns in free-space shuffle-exchange networks", Haney, Optics Letters, Dec. 1993, vol. 18, No. 23.

"Experimental validation of hybrid micro-macro optical method for distortion removal in multi-chip global free-space optical-interconnection systems", Christensen et al., Applied Optics vol. 41, No. 35 Dec. 10, 2002.

"Low-distortion hybrid optical shuffle concept", Christensen et al., Feb. 1, 1999, Optics Letters / vol. 24, No. 3.

"Two-bounce optical arbitrary permutation network", Christensen et al., May 10, 1998, Applied Optics / vol. 37, No. 14.

"Description and Evaluation of the FAST-Net Smart Pixel-Based Optical Interconnection Prototype", Haney et al., Proceedings of the IEEE, vol. 88, No. 6, Jun. 2000.

"FAST-Net optical interconnection prototype demonstration", Haney et al., J. Opt. A: Pure Appl. Opt. 1 (1999).

"Habilitation À Diriger Des Recherches", Marchand, Submitted to IEEE Transactions on VLSI, Sep. 1995.

"Optical Switch on a Chip: The Talbot Effect, Lüneburg Lenses & Metamaterials", Nikkhah, 2013.

"Novel lens design for free-space optical interconnects", Ramsey et al., OSA/IODC 2006.

"Novel lens design for free-space optical interconnects", Proc. SPIE 6342, International Optical Design Conference 2006, 634218 (Jul. 17, 2006).

"Lie Algebraic Methods of Light Optics for Lens System Design used in OTIS Architecture", Pijitrojana, Thammasalnt t. J. Sc.T ech.,vol. 9, No. 2, Apr.-Jun. 2004.

Optical Transpose Interconnection System Architectures, Pijitrojana, Thammasalnt t. J. Sc.T ech.,vol. 8, No. 4, Oct.-Dec. 2003.

"Optically Augmented 3-D Computer: Technology and Architecture", Marchand, 1994 IEEE.

"Optical transpose interconnection system architectures",Marsden et al., Jul. 1, 1993 / vol. 18, No. 13 / Optics Letters.

\* cited by examiner

OPTICAL SHUFFLE COMPUTATION NETWORK

BACKGROUND OF THE INVENTION

Field of the Invention

This application relates generally to optical systems for communication in computational systems, and more specifically to techniques and devices for computing with shuffle-exchange systems using optical systems to perform the shuffle.

Discussion of Related Art

Computational systems are increasingly limited by the wires used to interconnect processing elements. The signal delay for the longer wires dominates the gate delay. These wires consume more space on the system as the computational systems grow in complexity. And as the feature size is made smaller, the power dissipated by a long-distance wire dominates the power required for a gate.

The on-chip long-wire interconnect requires buffered segments to overcome a delay which otherwise grows quadratically with wire length. With periodic buffering, the delay and power required for a wired interconnect still grow linearly with interconnect length.

The industry is searching for an interconnect technology which has high density, has minimal delay and has a power consumption level that grows more slowly than the interconnection length.

Optical interconnections for VLSI have been explored in both waveguide form and free space form. Efforts to utilize optical waveguides provide high speed optical interconnects, but these cannot easily provide a number of channels which scales with chip area, since the channels usually exit the chip edge.

Free space optical interconnects have been proposed, which route data out the surface of the chip. For regular interconnection patterns, these can have a very high density, approaching the maximum given by the space-bandwidth product of the system. The versions of these that utilize space-variant interconnection patterns do not have this high density, but they allow a choice of interconnects not available with the regular interconnection patterns.

Optical shuffle-exchange networks take advantage of the long-range connection capabilities of optics by performing the shuffle in the optical system. Combined with arbitrarily configurable exchange subnetworks, a multistage version of these systems would be able to perform space variant interconnects. However large, configurable exchange subnetworks have significant complexity in themselves, because an exchange network with full degrees of freedom is combinatorially complex. Additionally, optical shuffle networks, to date, have not been developed with density comparable to the available space-bandwidth product of the optical system, due to underfilled subarrays in the shuffle, and systems that can't be tiled into larger networks.

Consequently, the industry is searching for a high-density optical interconnect technology which has minimal delay, low power consumption and which can maintain high density interconnects while scaling with increasingly complex computational systems.

SUMMARY OF THE INVENTION

The present invention provides an optical network that allows effective routing of signals between collected arrays of ports and dispersed arrays of ports on electronic computing chips (reversibly, also between the dispersed arrays and the collected arrays).

Apparatus for optical communication includes an originating chip segment comprising an array of originating tiles, which each comprise arrays of transmitters configured to transmit beamlets perpendicular to the tiles and a terminating chip segment comprising an array of terminating tiles, the terminating tiles each comprising arrays of receivers. Each transmitter corresponds to a particular receiver.

An originating lenslet array having two parallel layers of lenslets is parallel and adjacent the array of originating tiles. Each lenslet pair within the lenslet array pair corresponds to a tile. The lenslet array pair collimates beams from transmitters such that the location of a transmitter within its tile determines the direction of its resulting collimated beam.

Similarly, a terminating lenslet array pair focuses collimated beams to receivers such that the direction of a collimated beam determines which receiver it is focused on. Thus, beamlets transmitted from the transmitters pass through the originating lenslet array and the terminating lenslet array such that the beamlet from each transistor arrives at its corresponding receiver.

In a useful embodiment, the originating chip segment comprises collected tiles, and the terminating chip segment comprises dispersed tiles (designated itels).

Generally, the beamlet from each transmitter within a originating tile is directed to a different terminating tile. For example, if each transmitter and each receiver has a pixel number within its tile and a tile number within its array, and then the pixel number and tile number of each transmitter is a transpose between the pixel number and the tile number of its corresponding receiver.

As a feature, the originating transmitters are densely spaced such that the distance between adjacent transmitters on a tile is on the order of an f-number of the originating lenslet array pair times a wavelength of light being transmitted by the transmitters. Similarly, the distance between adjacent originating tiles is much smaller than the width of a tile.

In some systems, external illuminations is provided and the transmitters are modulators. It is useful to have the modulators illuminated by circularly polarized light.

Systems also often operate in the reverse direction, meaning the transmitters are transmitter-receivers, the receivers are receiver-transmitters, and a beam from a receiver-transmitter is directed to its corresponding transmitter-receiver. Both can be modulators.

Optical communications systems may also be used to shuffle data. For example the terminating chip converts beams received at a first set of receiver-transmitters to electric signals, routes the electric signals to a second set of receiver-transmitters and converts the electric signals back to optical signals for transmission by the second set of receiver-transmitters to their corresponding transmitter-receivers.

An embodiment of the invention includes a free-space optical train disposed between the collected array of tiles and the dispersed array of tiles and an array of optoelectronic transducers (pixels) on each tile for converting back and forth between optical and electrical signals. A tile is a collection of transducers that sends and/or receives light through a common lenslet or lenslet pair. The free-space optical train includes a lenslet array to collimate the optical signals, a lenslet array to focus the optical signals and a system for routing the optical signals from the collimating lenslets to the focusing lenslets. The system for routing the optical signals can include a Fourier transform lens to map the array of angles from each collimating lens in the collimating lenslet array to the array of positions making up the focusing lenslet array. The free-space optical train may perform a shuffle rearrangement of the signals. The system for routing the optical signals can be incorporated into the focusing and collimating lenslet arrays. The optoelectronic transducers for converting back and forth between optical and electrical signals may be emitters that can also be used as detectors. The optoelectronic transducers may be optical modulators that can also be used as detectors. The free-space optical train may include beam splitters, for example, to accept light from an external source and route it to the modulators acting as optoelectronic transducers. The electronic signals on tiles of the dispersed array may be rearranged by electrical connections (exchanged) and converted back to an optical signal transmitted to the collected array. Transmission of the optical signals from the dispersed array back the collected array may traverse the same optical system with the focusing lenslet array acting as a collimating array and the collimating array acting as a focusing array in the back transmission of the signals. Herein the term transmitter includes modulators.

The invention includes dynamic (rearrangement) embodiments and static embodiments. In dynamic embodiments, the signals on the dispersed array are a rearranged with time dependent patterns. In static embodiments, the path of the signals on the dispersed array remains the same during a computation.

In some embodiments of the invention, the rearrangement of signals on the dispersed array tiles is achieved by routing the signals with a nearest-neighbor-interconnected store and forward connection. In other embodiments, the rearrangement of signals may be done with long and short interconnections between elements on the dispersed array tiles.

In some embodiments of the invention the dispersed array contains memory registers used for storing data for the computational system.

In some embodiments of the invention, the collected array contains blocks of computational elements arranged in systolic arrays of multiply-accumulators for vector-matrix multiply and matrix-matrix multiply operations.

In some embodiments, a block of data is transmitted from a source collected array tile to a destination collected array tile by transmitting it to a block of dispersed array tiles and providing that each of the dispersed array tiles in the block move the signal with the same pattern as each other, before transmitting the signals back to the collected array tiles. The block of data is moved a long range across the collected tiles by moving each signal within the block a small range on the dispersed tiles.

It is desirable to build the optical transducers as telecentric, high-numerical aperture modulators or emitters, since this allows the highest density of signal channels. It is also desirable to provide a transversely compact optical system constituting the lenslet for each tile, so that the lenslet array to collimate the optical signals, and the lenslet array to focus the optical signals remain compact, and consequently allow that the dead space between the tiles remains small. It is also desirable to provide a transversely compact optical system for routing the optical signals between the collimating lenslets and the focusing lenslets, so that multiple free-space optical trains addressing their own arrays of tiles may be laid side to side and connected electronically with short electrical interconnects.

An application where the computational elements arranged in systolic arrays of multiply-accumulators might involve the use of the matrix-matrix multiplier to compute activity in an artificial neural network.

A system for communicating between VM multipliers (computational elements) with an intermediate stage may include features where the intermediate stage has high memory capacity or the intermediate stage has routing The VM may be matrix-matrix multipliers or systolic arrays.

An optical system is taught for performing an N-way shuffle (transpose), performing the same permutation (possibly with copying) on each tile of the shuffled plane, and performing the N-way shuffle back to the original plane, for moving/copying data in large blocks. The shuffled plane can contain high memory density for storing intermediate results

DESCRIPTION OF SPECIFIC EMBODIMENTS

The following description sets forth embodiments of an optical shuffle computation network according to the invention. Embodiments of the invention can be applied to computational environments such as artificial neural network systems, array computation, memory access and to networked computational systems.

The general functionality of the optical shuffle computation network is to accept signals from an array of collected tiles, transmit signals from each over a long range to a set of dispersed tiles, where the signals may access memory and where the signals may be exchanged locally and transmitted back to the original or to an exchanged collected tile.

Figure 1A:
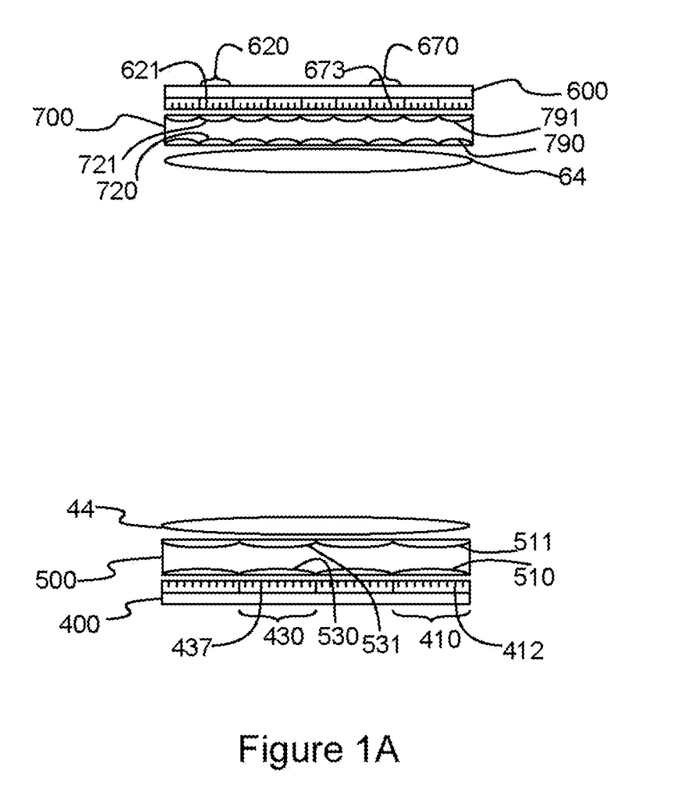
FIG. 1A shows a top view of an optical shuffle computation network according to an embodiment of the invention.

FIGS. 1A-1E are schematic top views of an optical shuffle-exchange network according to an embodiment of the invention. FIG. 1A shows communication between optoelectronic transducer arrays 400 and 600. In the specific embodiment shown in FIGS. 1A-1E, collected array 400 is a portion of the originating chip (not shown) and dispersed array 600 is a portion of a separate terminating chip (not shown). In other embodiments with reflective optical elements, array 400 and array 600 may be on the same chip.

Originating transducer array has four tiles 410, 420, 430, and 440 with nine pixels or transducers (receivers, transmitters, modulators, etc.) each (in the one dimension shown). The second pixel in the first tile 410 is pixel 412. In general, pixels are designated something like $P_{tile,pixel}$ so pixel 412 is $OP_{1,2}$ in that notation. To avoid confusion in this description, a different reference number is used for each pixel discussed. Pixel 437 is seventh pixel in the third tile, 430. It could be designated $OP_{3,7}$.

Terminating transducer array 600 has nine tiles 610, 620, 630, 640, 650, 660, 670, 680, and 690 with 4 pixels each. Pixel 621 ($TP_{2,1}$) is the first pixel in the second tile and pixel 673 ($TP_{7,3}$) is the third pixel in the seventh tile 670.

This embodiment may be bidirectional. In this discussion, transmission originates from collected array 400, so transducers 401-440 on the collected side are sometimes designated transmitter-receivers. The signals originating from array 400 terminate at dispersed array 600, and so transducers 601-690 on the dispersed side are sometimes designated receiver-transmitters.

Figure 1B:
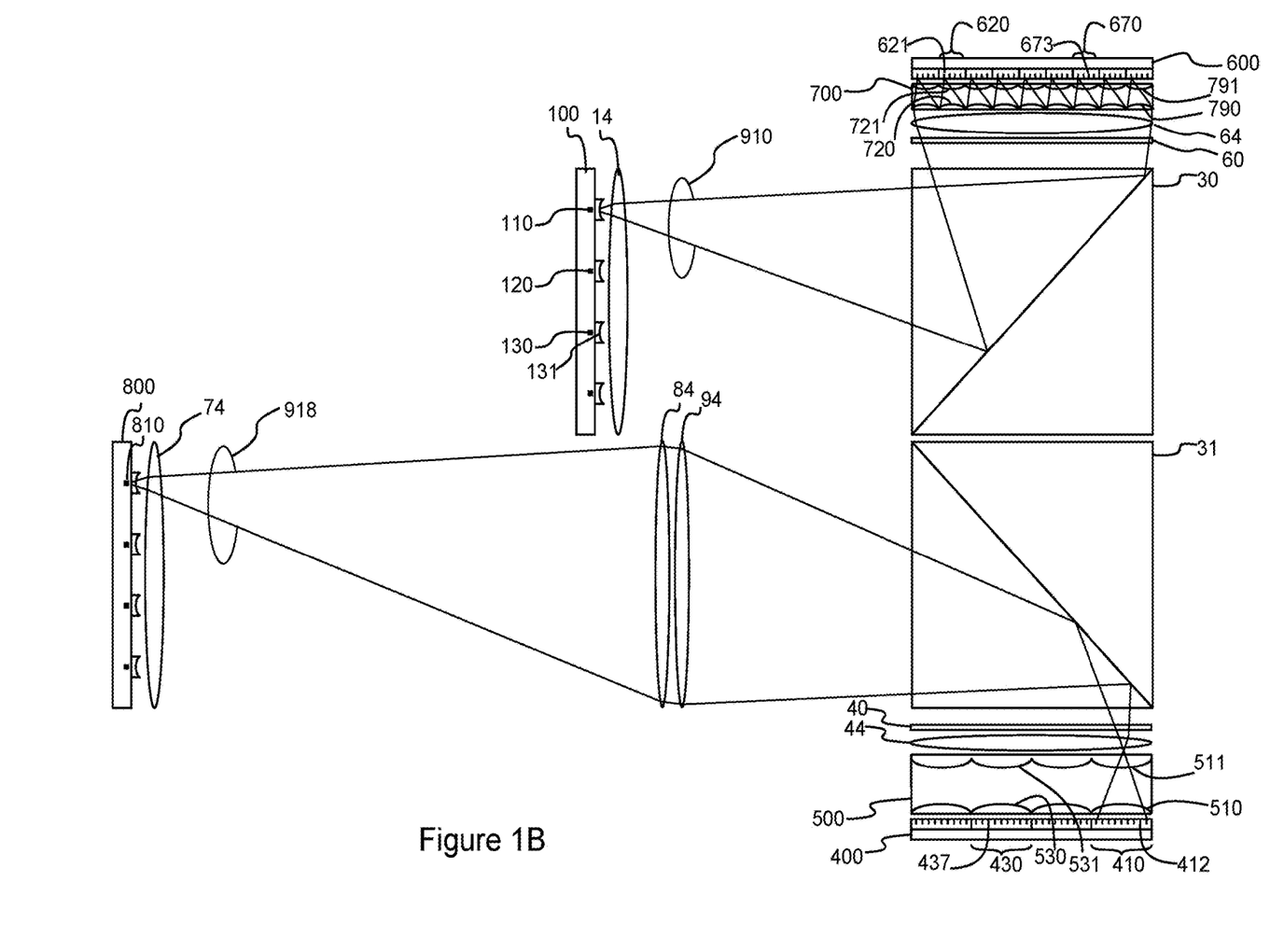
FIG. 1B shows the top view of the optical shuffle computation network of FIG. 1 according to an embodiment of the invention, with light sources illuminating one tile of the collected array of tiles and one pixel in each tile of the dispersed array of tiles.

FIG. 1B shows the embodiment of FIG. 1A with the addition of illuminating elements 100 and 800. In FIG. 1B, light source 100 illuminates the receivers on tiles 610, 620, 630, 640, 650, 660, 670, 680, 690. Light source 800 illuminates transmitter on tiles 410, 420, 430, 440.

Quarter-wave plates 40 and 60 rotate polarization of light from light sources 800, 100, so that after reflective modulation the light passes straight though polarizing beam splitters 31 and 30 from array 400 to array 600 and (in a two-way system) from array 600 to array 400. Optoelectronic transducers on array 400 and array 600 may operate as reflective modulators in signal transmitting mode, or as detectors in signal receiving mode.

FIG. 1B shows light source arrays 800 and 100 illuminating optoelectronic transducer arrays 400 and 600 through polarizing beam splitters 30 and 31 respectively, with the marginal rays from emitter 110 illuminating optoelectronic transducers on array 600. Emitter 110 on light source array 100 emits an s-polarized expanding beam 910 which is steered by lens 14 towards the center of the optical train. The beam 910 is reflected from polarizing beam splitter 30 and converted to circularly polarized light by quarter-wave plate 60. The expanding beam is collimated by lens 64 at an angle substantially proportional to the position from which it was emitted on emitter array 100. Lenslet array 700 focuses segments of the collimated beam from emitter 100 onto one pixel in each tile. The lenslet array 700 has lenslets corresponding to each tile at its first and last surface. At the right side of the figure, first lenslet 790 focuses the collimated light and the second lenslet 791 redirects the angled cone towards the normal to provide a substantially telecentric illumination of the pixel. The light from emitter 110 is shown lighting up pixel 621 (via lenslet 720 and 721) of tile 620, as well as the (unlabeled) first pixel in each of the remaining tiles 620, 630, 640, 650, 660, 670, 680, 690, on optoelectronic transducer array 600. Optoelectronic transducer 621 reflects the circularly polarized light with the amount of reflection related to the local signal.

Two-layer lenslets in arrays 500 and 700 operate as Fourier transform pairs for the tiles in arrays 400 and 600. Each tile faces a pair of lenslets (e.g. tile 410 faces lenslets 510 and 511). The cone of light from the transducer 412 is turned by the first lenslet 510 and the second lenslet collimates the light, directed at an angle corresponding to the position of the transducer. The lenslets 510 and 511 have a common focal length and are separated by a distance equal to the focal length. The lens pair 44 and 64 also have a common focal length and are separated by a distance equal to the focal length, making an additional Fourier transform pair. The transmitters may be densely packed, meaning that the distance between adjacent transmitters on a tile is on the order of an f-number of the originating lenslet array pair times a wavelength of light being transmitted by the transmitters. This allows the receiving lenslets 700 to also be densely packed, since the combination of lenslets 510, 511 and lenses 44,64 form a magnifying imaging system from the transducers in the tile 410 to the light entering the lenslet array 700. The two lens Fourier transform pairs create a compact optical system where light cones from one tile do not overlap the light cones from the adjacent tiles prior to exiting the lenslet array, when the tiles are densely packed, meaning that the distance between adjacent tiles is much smaller than the width of the tile—on the order of the distance between transmitters rather than the width of a tile.

FIG. 1B also shows the marginal rays from emitter 810 illuminating optoelectronic transducers on array 400. Emitter 810 on light source array 800 emits an s-polarized expanding beam 918 which is steered by lens 74 towards the center of the optical train. Lenses 84 and 94 collimate and refocus the beam toward and inverted image of the emitter. The beam 918 is reflected from polarizing beam splitter 31 and converted to circularly polarized light by quarter-wave plate 40. The focusing beam is bent towards the normal to provide a substantially telecentric illumination at the front surface of lenslet array 500. Lenslets 510 and 511 form a Fourier transform pair for tile 410, converting the illuminating spot at the front of lenslet 511 to a plane wave illuminating all of the optoelectronic transducers in tile 410. Optoelectronic transducer 412, in tile 410, reflects the circularly polarized light with the amount of reflection related to the local signal.

Figure 1C:
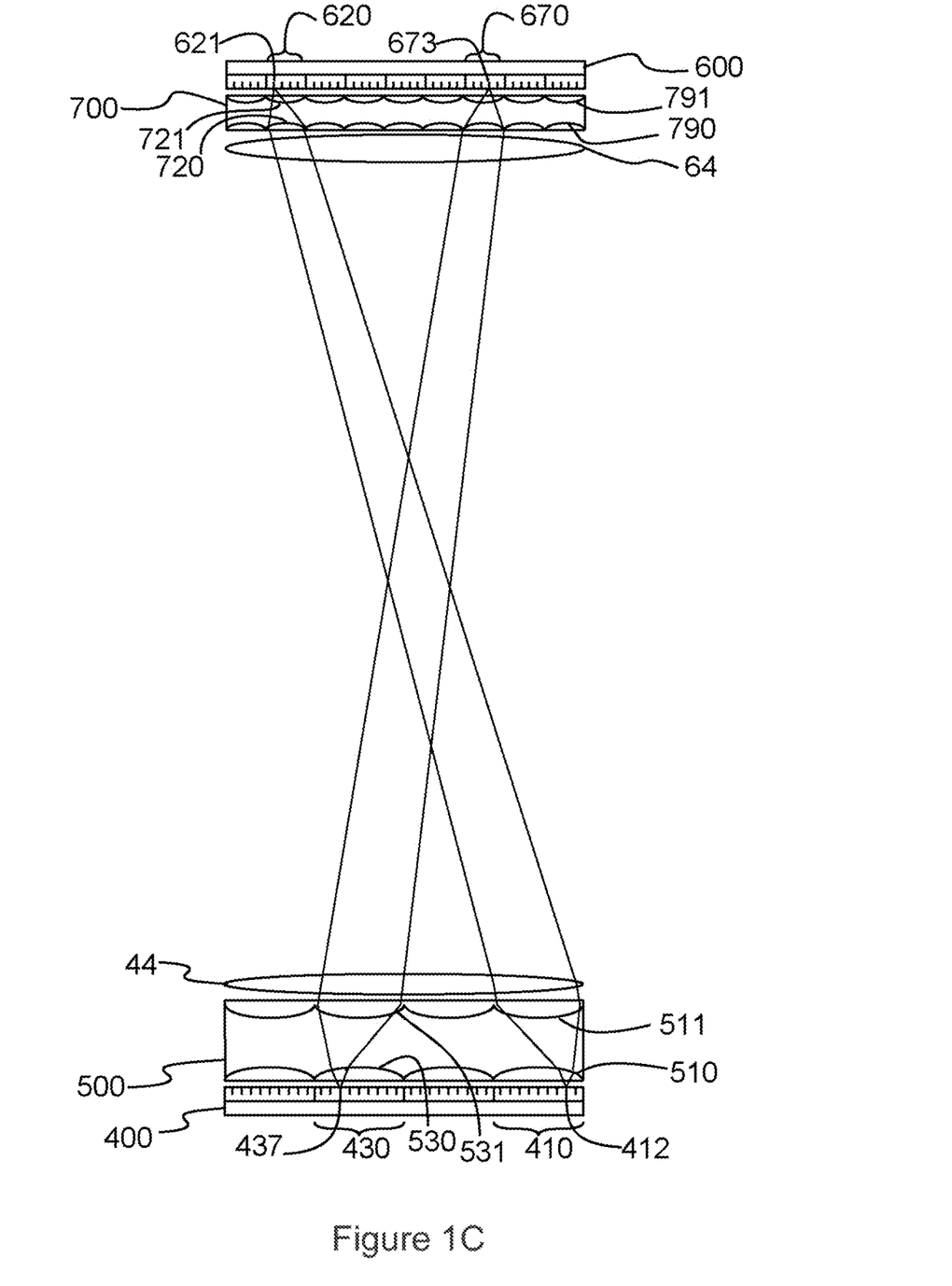
FIG. 1C shows the top view of the optical shuffle computation network of FIG. 1 according to an embodiment of the invention, with the light signals from one pixel in each of two tiles on the collected array of tiles communicating to one pixel in each of two tiles on the dispersed array of tiles.
Figure 1D:
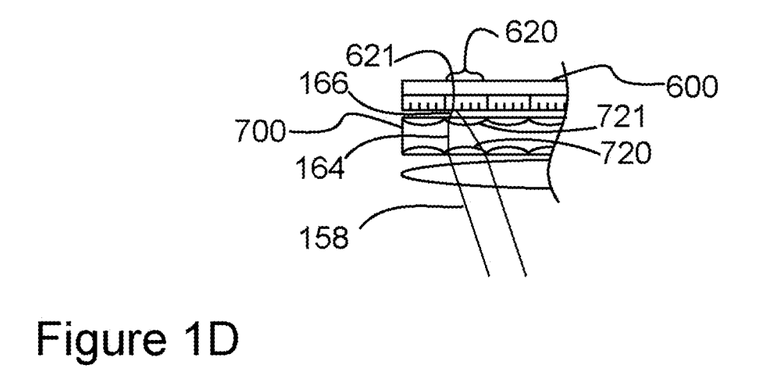
FIG. 1D is a magnified view of the top left corner of the embodiment of FIG. 1C.
Figure 1E:
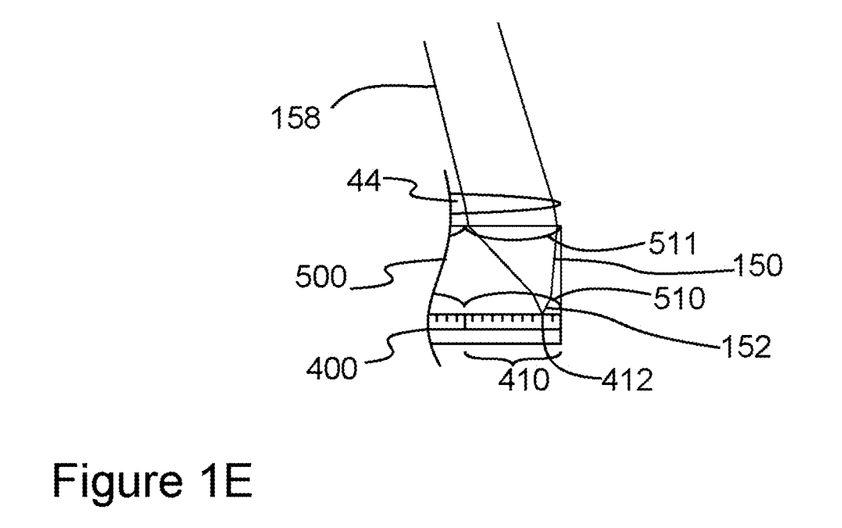
FIG. 1E is a magnified view of the bottom right corner of the embodiment of FIG. 1C.

FIG. 1C shows the marginal rays for signals communicating between optoelectronic transducers 412 and 621. FIGS. 1D and 1E show portions of FIG. 1C magnified for clarity. Lenses 44 and 64 are a system for routing the optical signals arranged as Fourier transform pair, so that angles at the input of lens 44 are mapped to positions at the output of lens 64 and vice versa.

As a specific example, lenslet 522 converts transmitted beamlet 150 into directed beamlet 152. Lenslet 524, along with lens 44 converts directed beamlet 152 into collimated beamlet 158. At the receiving end, lenslet 524 along with lens 64 converts collimated beamlet 158 into focused beamlet 164 which is received by receiver 621. Thus transmitter 412 corresponds to receiver 621 (and vice versa in the case of a reverse operating system where transmitter 412 is a transmitter-receiver and receiver 621 is a receiver-transmitter).

With optoelectronic transducer 412 acting as a reflective modulator, the circularly polarized light 150 coming from 412 is directed 152 by lenslet 522 towards the center of lenslet 524. Lenslet 524 collimates directed beamlet 152 into collimated beamlet 158, at an angle substantially proportional to the position of the optoelectronic transducer 412 within tile 410. Lens 44 bends beamlet 158 toward the center of the optical train. Quarter-wave plate 40 converts the circularly polarized light in the beamlet to p-polarized light that is transmitted by polarizing beam splitters 31 and 30. Quarter-wave plate 60 converts the light in the beamlet to circular polarization and lens 64 bends this beamlet toward the center of the optical train. A lenslet pair in lenslet array 700 focuses the light onto optoelectronic transducer 621 in tile 620. Optoelectronic transducer 621 acting as an optical detector converts the signal from optical to electronic.

FIG. 1C also shows the marginal rays for signals communicating between optoelectronic transducers 673 and 437. The transmitted beamlet 150 from the seventh pixel in the third tile (437) on collected array 400 communicates with the third pixel in the seventh tile (673) on dispersed array 600. The light train in this embodiment of the invention connects the pairs of pixels that have a transpose of the pixel number in the tile and the tile number in the array (see FIG. 2). In embodiments where each of the pixels is able to act as transmitter (e.g. modulator) or as detector, the system is can send signals bidirectionally between the collected array 400 and the dispersed array 600.

Figure 2A:
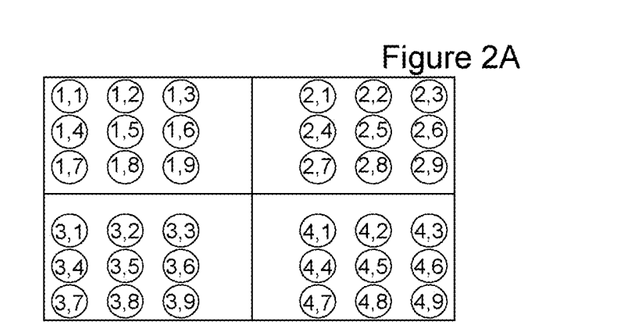
FIGS. 2A-2C show the connectivity pattern between pixels on tiles from a collected array of tiles to pixels on tiles on a dispersed array of tiles.
Figure 2B:
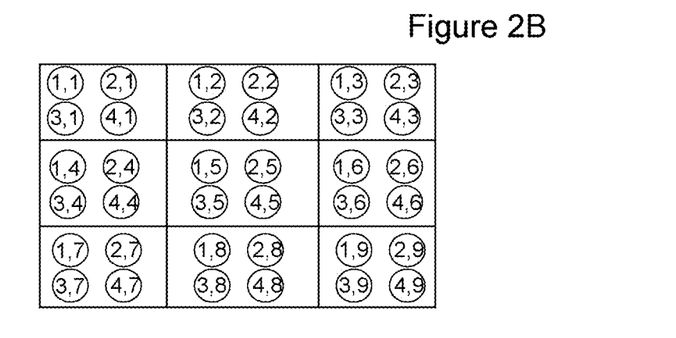
Figure 2C:
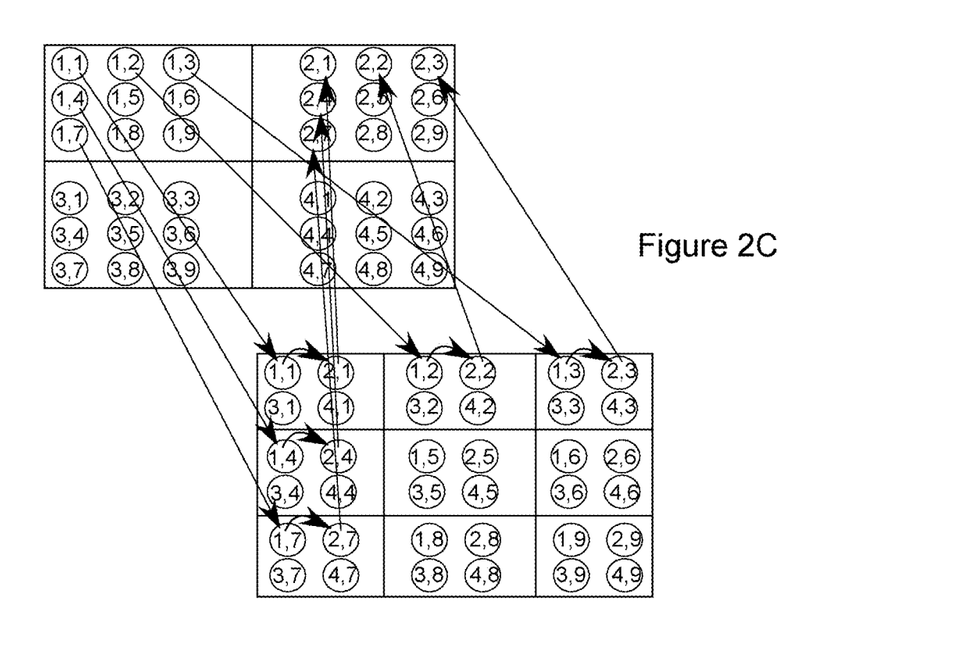

FIGS. 2A 2C show the pattern of interconnectivity in two transverse dimensions. The horizontal dimension of FIG. 2A is the horizontal dimension of an originating optoelectronic transducer array. The vertical dimension of the array of FIG. 2A is out of the plane of the page of FIG. 1. Similarly, the horizontal dimension of the array of FIG. 2B is the horizontal dimension of a terminating array. The vertical dimension of FIG. 2B is out of the plane of the page of FIG. 1. FIG. 2A shows the originating array with two by two tiles, with arrays of three by three pixels in each tile. FIG. 2B shows the terminating array with three by three tiles, with arrays of two by two pixels in each tile. The mapping of pixel communication from the originating array of FIG. 2A to the terminating array of FIG. 2B is indicated by common numerical pair labels. The pixels in the upper left tile in FIG. 2A are mapped to the upper left pixel in each tile in the array of FIG. 2B. The transpose of the pixel number in the tile and the tile number in the array is effective in both the horizontal and the vertical. FIG. 2C includes lines showing how some of the pixels are mapped, demonstrating that pixels for each tile are spread both vertically and horizontally.

Returning to FIG. 1C, lens pair 44 and 64 is a system for routing the collimated beamlets 158 from lenslets 511, 521, 531, 541 to positions on lenslet array 700 substantially proportional to the angle of the beamlets 158. This system for routing the optical beamlets performs the same mapping on beamlets from different input tiles.

Figure 3A:
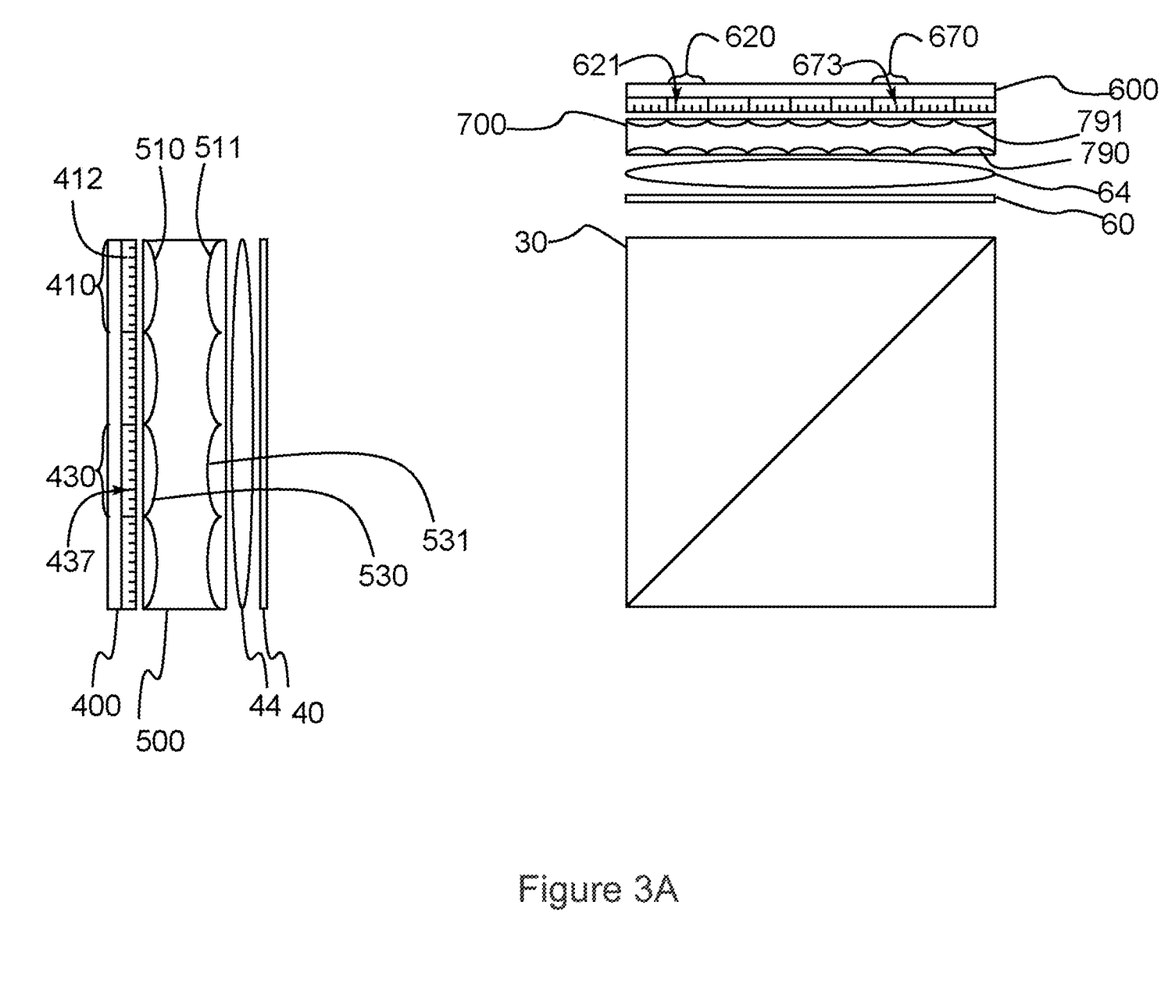
FIGS. 3A, 3B, and 3C show a top view of an optical shuffle computation network according to another embodiment of the invention where a single polarizing beam splitter is used in conjunction with wave plates to route light.
Figure 3B:
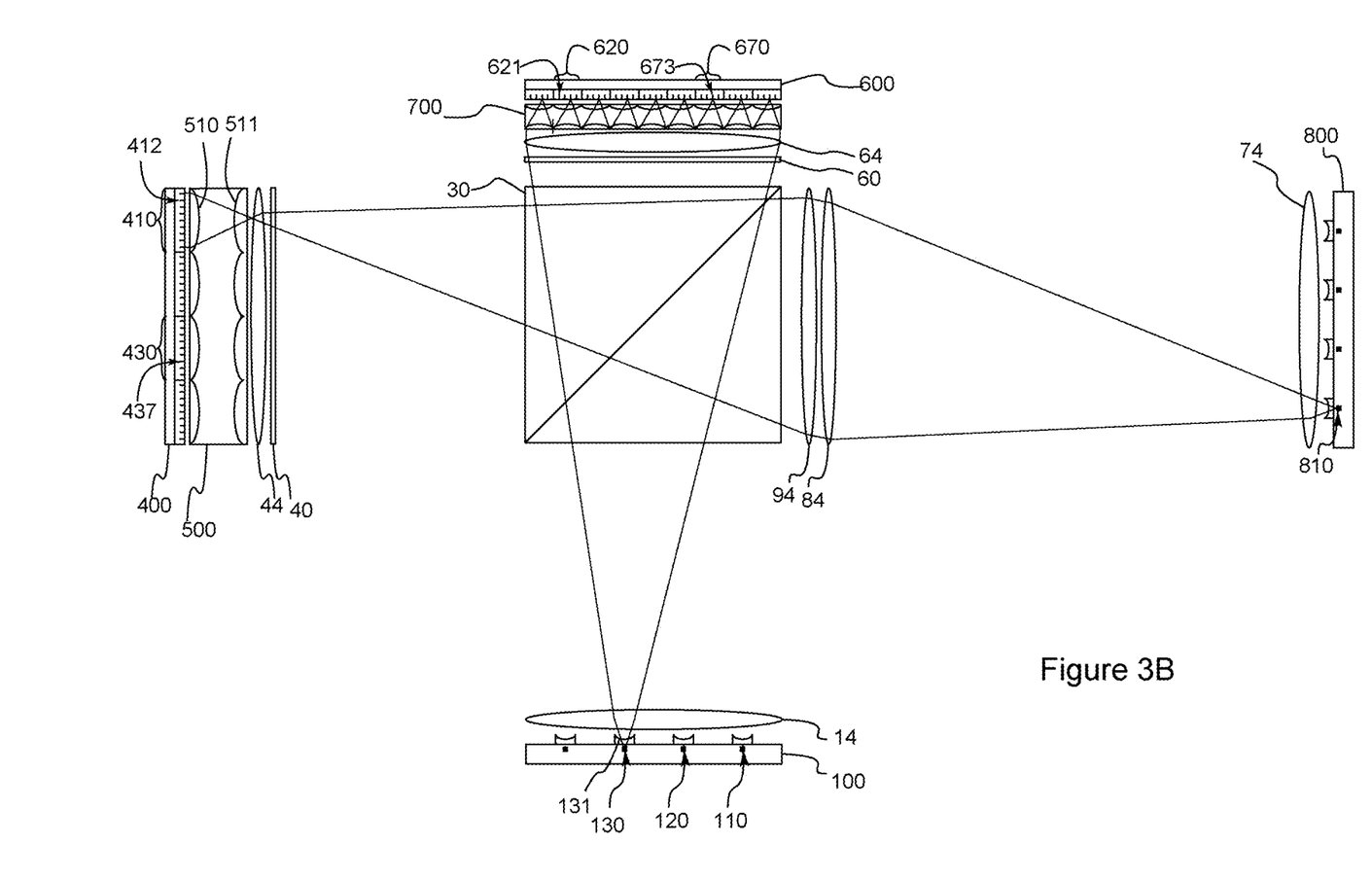
Figure 3C:
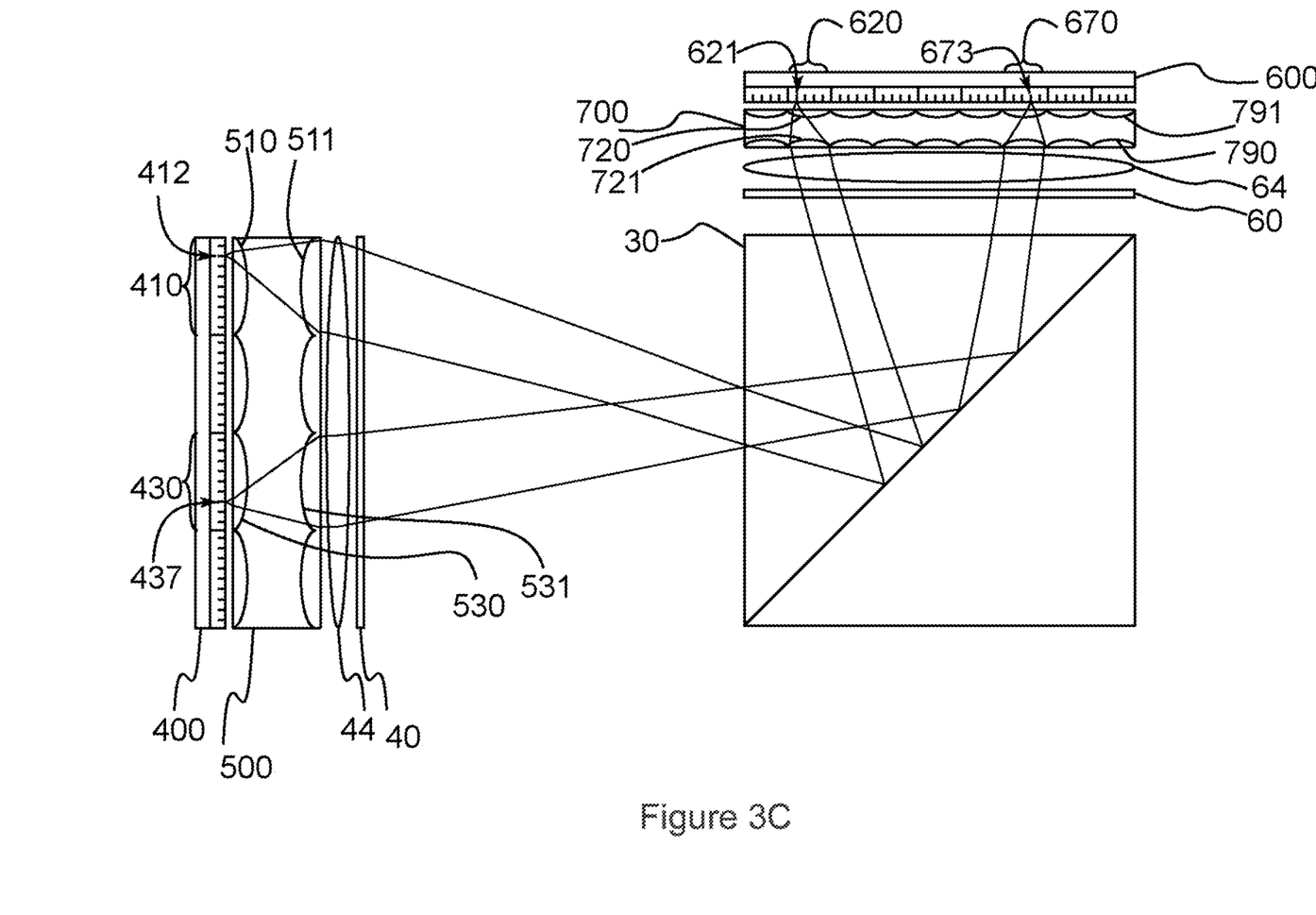

FIGS. 3A, 3B, and 3C show a top view of an optical shuffle computation network according to another embodiment of the invention. When illumination sources 100, 800 are used, a single polarizing beam splitter 30 is used on conjunction with wave plates 40, 60 to route light from the light sources 100, 800 to the optoelectronic transducers used as modulators (modulating pixels) and from the modulating pixels to the optoelectronic transducers used as detectors. Thus there is no light leakage from 100 to 400. Light leakage into 800 is not a concern. This embodiment is similar to that of FIGS. 1A-1C, except that a reflective element (here a beam splitter) is used so the arrays 400 and 600 may be placed closer together. Again transmitter 437 corresponds with receiver 673 and transmitter 412 corresponds with receiver 621.

Figure 4:
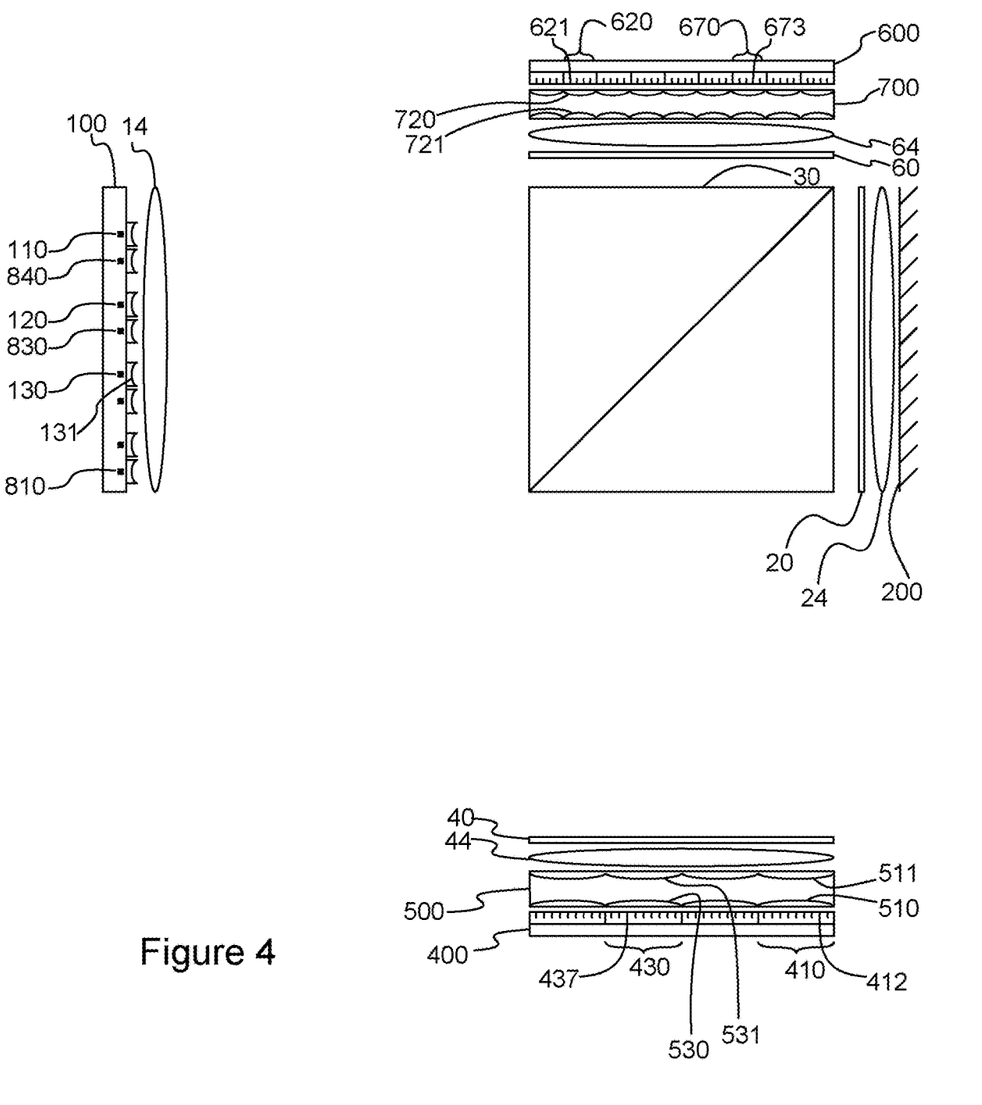
FIG. 4 shows a top view of an optical shuffle computation network according to another embodiment of the invention where a light source plane has dual polarizations.

FIG. 4 shows a top view of an optical shuffle computation network according to another embodiment of the invention where a light source plane 100 has dual polarizations for lighting up either of two paths available in a polarizing beam splitter and directing the illumination to the dispersed array of tiles 600 or the collected array of tiles 400 according to polarization. This embodiment is similar to that of FIGS. 1A-1C, but only requires one illumination source 100.

Figure 5:
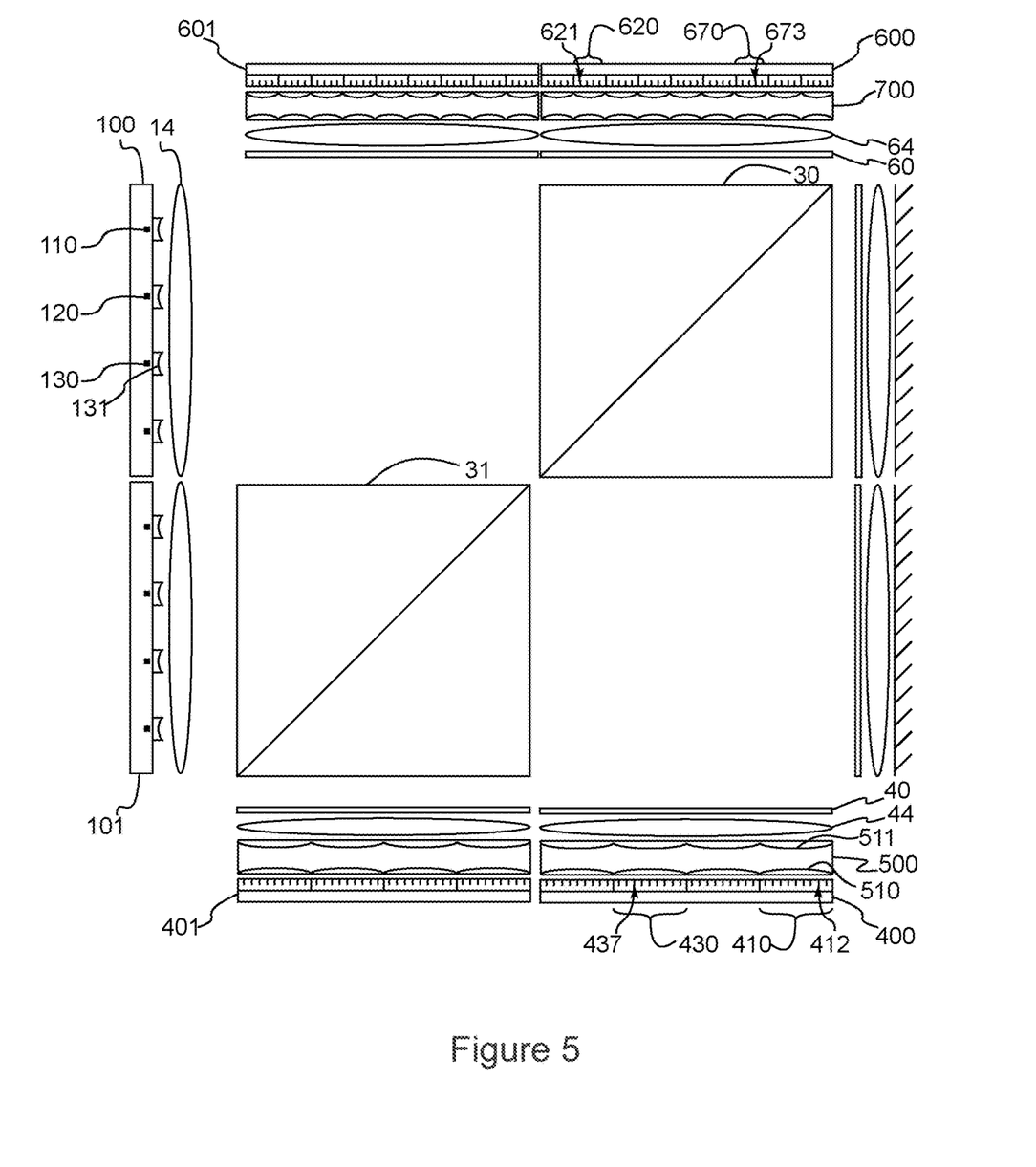
FIG. 5 shows a top view of two interleaved optical shuffle computation networks based upon the embodiment of the invention shown in FIG. 4.

FIG. 5 shows a top view of two interleaved optical shuffle computation networks based on the embodiment of FIG. 4. In this embodiment, two systems share the same space. Arrays 400 and 401 are near each other in distance to facilitate electrical communication. They can be optically independent or a die can straddle them.

Figure 6A:
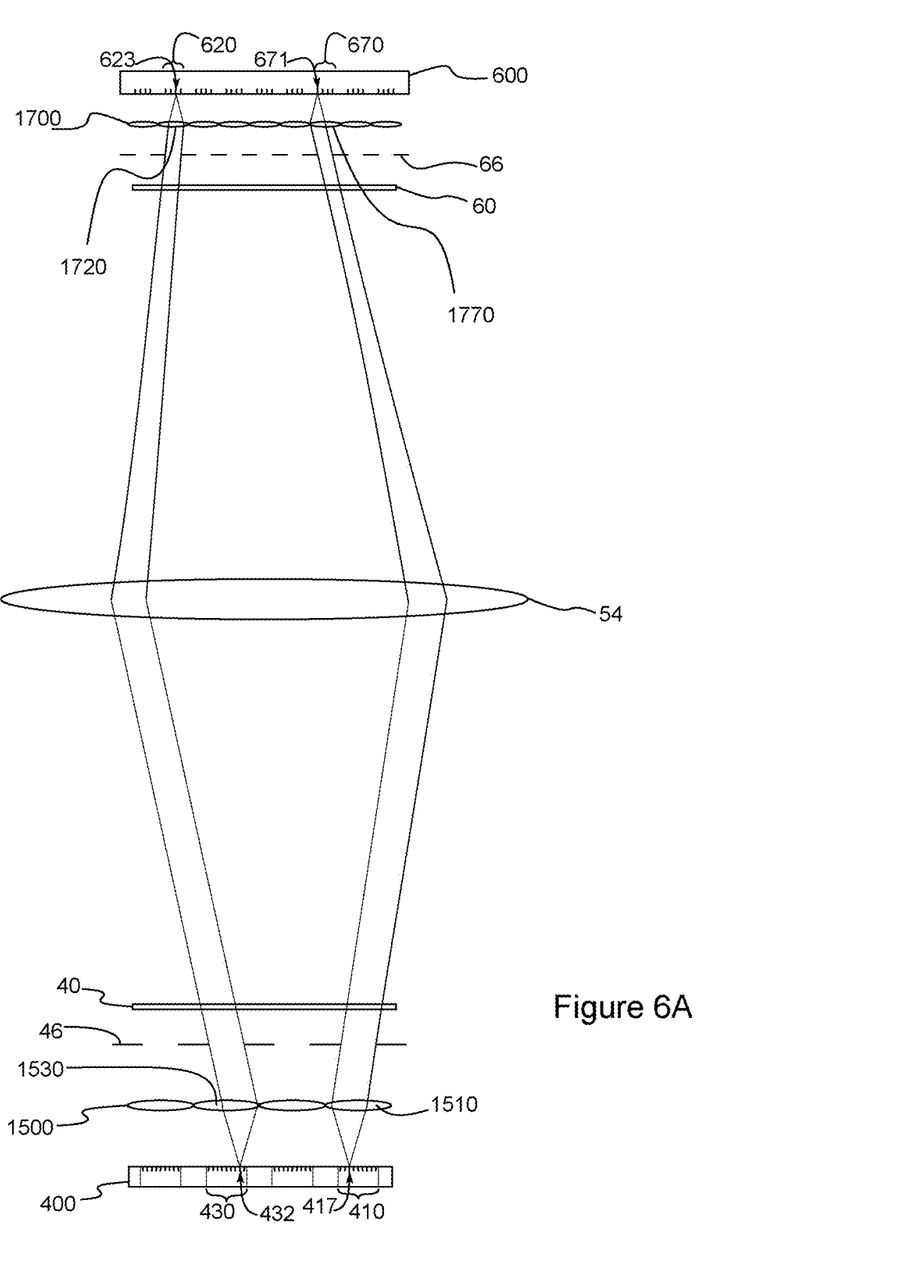
FIGS. 6A and B show optical shuffle computation networks utilizing Fourier optics.
Figure 6B:
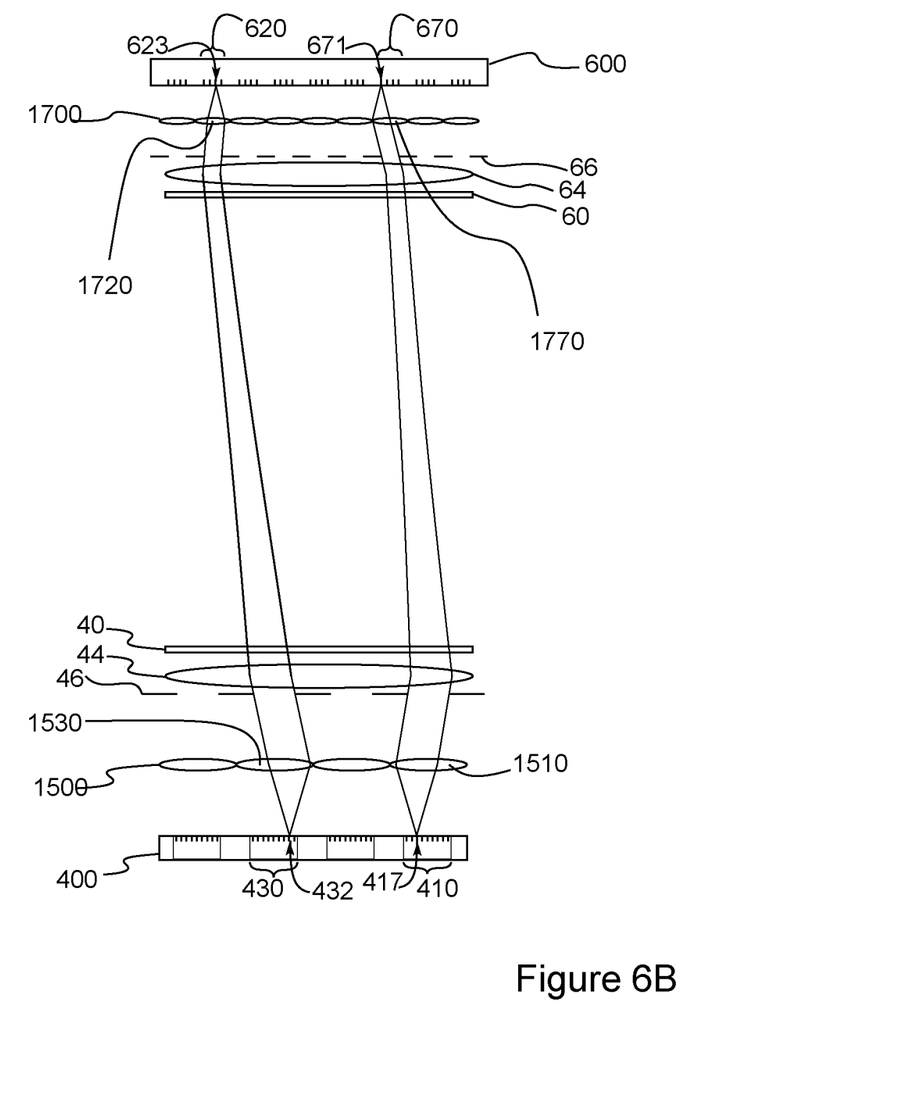

FIGS. 6A and 6B show optical shuffle computation networks which use, for the system for routing the optical signals, Fourier transform lens systems In FIG. 6A a single lens Fourier transform is used. In FIG. 6B a dual lens Fourier transform is used, saving space.

Compact subarrays are enabled by the two lenslet Fourier transform. Two lenses separated by their focal length perform a Fourier transform of the light field. The lenslet nearest the modulator plane, 1530, steers the rays from each modulator/detector towards the center of a second lens, 1531. The second lens collimates these rays. This compact system allows one to densely pack subarrays at the input and output of a transposer, with minimal gaps between subarrays.

An optical transposer may be used in a neural network. We put a systolic-array matrix-multiplier on each subarray on one side of the transposer, and we put routing and memory on the other side of the transposer. This creates a connected set of systolic-array matrix-multipliers whose connections can be reconfigured on the routing and memory side. Memory registers are all a short distance from each systolic array due to the long range distributed connectivity of the transposer. This enables an efficient artificial neural network, since signal routing and memory access are the high latency, high energy dissipation parts of neural networks in current technology.

A system that moves blocks of data large distances by communicating blocks of data (tiles) with the use of a transpose, performing the same short-distance shift on each component of the dispersed block of data (itels), transposing back again so that the block of data (tile) is reconstructed with a large-distance shift proportional to the short-distance shift performed on each component. FIG. 2C shows this data motion where the optical transposer moves a block of data to the itel, the itel is moved to its neighbor itel and the optical transposer moves the data back. In this example the small motion of one itel is converted to a large motion of a block of data from one tile to the neighboring tile.

While the exemplary preferred embodiments of the present invention are described herein with particularity, those skilled in the art will appreciate various changes, additions, and applications other than those specifically mentioned, which are within the spirit of this invention. "Signals" can mean digital bits, digital on off, or phase and amplitude modulated signals, or analog. The optoelectronic transducer can be 2-mode semiconductor device, or polarization walkoff. The lenses 14,84,94,44,64, as shown all have same focal length, but can be vary to expand beams or the like. Time multiplexing can be used for either transmit or receive or both. Optics for compact FT, tiles packing, transposer packing can be used.

The number of transmitters in an originating tile may be equal to the number of tiles in the destination or terminating array. The interconnection pattern between transmitters and receivers may be configured to be an N-way perfect shuffle. The transmitters may comprise LEDs or VCSELs.

What is claimed is:

1. Apparatus for optical communication comprising:
an originating chip segment comprising an array of originating tiles, the originating tiles each comprising arrays of transmitters configured to transmit beamlets outward from the originating tiles;
a terminating chip segment comprising an array of terminating tiles, the terminating tiles each comprising arrays of receivers;
wherein each transmitter corresponds to a receiver;
an originating lenslet array comprising a first originating layer and a second originating layer of lenslets parallel and adjacent to each other and to the array of originating tiles, the lenslets in the first originating layer forming originating lenslet pairs with the lenslets in the second originating layer, the originating lenslet pairs constructed and arranged to collimate beams from transmitters such that the location of a transmitter within its tile determines the direction of its resulting collimated beam;
a terminating lenslet array comprising a first terminating layer and a second terminating layer of lenslets parallel and adjacent to each other and to the array of terminating tiles, the lenslets in the first terminating layer forming terminating lenslet pairs with the lenslets in the second terminating layer, the terminating lenslet pairs constructed and arranged to focus collimated beams to receivers such that the direction of a collimated beam determines the receiver it is focused on;
wherein beamlets transmitted from the transmitters pass through the originating lenslet array and the terminating lenslet array such that a beamlet from each transmitter arrives at its corresponding receiver.

2. The apparatus of claim 1 wherein the originating chip segment comprises collected tiles, and the terminating chip segment comprises dispersed tiles (designated itels).

3. The apparatus of claim 2 wherein a beamlet from each transmitter within an originating tile is directed to a different terminating tile.

4. The apparatus of claim 1 configured such that each transmitter and each receiver has a pixel number within its tile and a tile number within its array, and wherein the pixel number and tile number of each transmitter is a transpose between the pixel number and the tile number of its corresponding receiver.

5. The apparatus of claim 1 wherein the transmitters are densely spaced such that the distance between adjacent transmitters on a tile is on the order of an f-number of the originating lenslet pairs times a wavelength of light being transmitted by the transmitters.

6. The apparatus of claim 5 wherein the distance between adjacent originating tiles is much smaller than the width of a tile.

7. The apparatus of claim 1 wherein the transmitters are modulators.

8. The apparatus of claim 7 wherein the modulators are illuminated by circularly polarized light.

9. The apparatus of claim 1 configured to operate in the reverse direction, wherein the transmitters are further configured to be transmitter-receivers, the receivers are configured to be receiver-transmitters, and a beam from a receiver-transmitter is directed to its corresponding transmitter-receiver.

10. The apparatus of claim 9 wherein the transmitter-receivers and the receiver-transmitters are modulators.

11. The apparatus of claim 10 wherein the modulators are illuminated by circularly polarized light.

12. The apparatus of claim 9 wherein the terminating chip segment is further configured to convert beams received at a first set of receiver-transmitters to electric signals, route the electric signals to a second set of receiver-transmitters and convert the electric signals to optical signals for transmission by the second set of receiver-transmitters to their corresponding transmitter-receivers.

13. A method of transferring a block of data comprising the steps of:
constructing an array of transmitter tiles on a semiconductor substrate, each transmitter tile forming an array of transmitters, each transmitter configured to transmit a beam of data;
constructing an array of receiver tiles on a semiconductor substrate, each tile forming an array of receivers, each receiver configured to receive a beam of data;
communicating a block of data comprising beams of data from the array of transmitters to a dispersed array of receivers such that each beam of data from a given transmitter tile is received by a different receiver tile, wherein received beams of data from a given transmitter tile are designated an itel;
shifting itels on the array of receiver tiles;
retransmitting the shifted itels from the array of receiver tiles, and
receiving the retransmitted data as a block of data on a terminating array.

14. Apparatus for optical communication comprising:
an originating chip segment comprising an array of originating tiles, the originating tiles each comprising arrays of originating transceivers configured to receive and transmit beams at the tiles;
an intermediate chip segment comprising an array of intermediate tiles, the intermediate tiles each comprising arrays of intermediate transceivers configured to receive and transmit beams at the tiles;
wherein each originating transceiver corresponds to an intermediate transceiver;
an originating lenslet array parallel and adjacent to the array of originating tiles, the originating lenslet array constructed and arranged to collimate beams from the originating transceivers and to focus collimated beams that are directed towards the originating transceivers;
an intermediate lenslet array parallel and adjacent to the array of intermediate tiles, the intermediate lenslet array constructed and arranged to focus collimated beams that are directed towards the intermediate transceivers and to collimate beams from the intermediate transceivers;
an optical element configured to combine with lenslets within each lenslet array to form Fourier transform optics; and
circuitry at the intermediate chip configured to convert beams received at a first set of receiver-transmitters to electric signals, route the electric signals to a second set of receiver-transmitters and convert the electric signals to optical signals for transmission by the second set of receiver-transmitters to their corresponding transmitter-receivers.

* * * * *